US011121592B2

(12) United States Patent
Fatemi et al.

(10) Patent No.: US 11,121,592 B2
(45) Date of Patent: Sep. 14, 2021

(54) ELECTRIC MACHINE CORE WITH ARCUATE GRAIN ORIENTATION

(71) Applicant: GM Global Technology Operations LLC, Detroit, MI (US)

(72) Inventors: Alireza Fatemi, Canton, MI (US); Derek F. Lahr, Howell, MI (US); James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 16/377,853

(22) Filed: Apr. 8, 2019

(65) Prior Publication Data

US 2020/0321814 A1 Oct. 8, 2020

(51) Int. Cl.
*H02K 1/24* (2006.01)
*H02K 19/10* (2006.01)
*H02K 15/02* (2006.01)
*H02K 1/16* (2006.01)
*B60K 1/00* (2006.01)

(52) U.S. Cl.
CPC ............. *H02K 1/246* (2013.01); *H02K 1/16* (2013.01); *H02K 15/022* (2013.01); *H02K 19/103* (2013.01); *B60K 1/00* (2013.01); *B60Y 2400/60* (2013.01); *H02K 2201/18* (2013.01)

(58) Field of Classification Search
CPC ...... H02K 15/022; H02K 15/02; H02K 41/06; H02K 19/103; H02K 1/16; H02K 1/246; H02K 1/02; H02K 1/148; H02K 1/24; H02K 19/10; H02K 2201/18; B60K 1/00; B60Y 2400/60
See application file for complete search history.

(56) References Cited

U.S. PATENT DOCUMENTS

| 2,415,012 | A | 1/1947 | James |
| 7,976,645 | B2 | 7/2011 | Ushigami et al. |
| 8,786,158 | B2 * | 7/2014 | Neuenschwander ........... H02K 15/095 310/216.043 |
| 9,175,680 | B2 * | 11/2015 | Miyaki .................. F04C 11/008 |
| 9,246,361 | B2 * | 1/2016 | Yang ......................... H02K 1/24 |
| 9,627,116 | B2 | 4/2017 | Dorninger et al. |
| 9,761,361 | B2 | 9/2017 | Okabe et al. |
| 10,020,103 | B2 | 7/2018 | Watanabe et al. |

(Continued)

*Primary Examiner* — Naishadh N Desai
(74) *Attorney, Agent, or Firm* — Quinn IP Law (57) ABSTRACT

A rotary electric machine, e.g., a cycloidal reluctance motor, includes a stator having stator teeth connected to a cylindrical stator core, and a rotor having a cylindrical rotor core. The stator core and/or rotor core are constructed of grain-oriented, spirally-wound ferrous material having a circular or annular grain orientation. The stator teeth may be constructed of grain-oriented steel having a linear grain orientation. Notches may be spaced around an inner circumferential surface of the stator core, with each stator tooth engaged with a respective notch. The rotor may be eccentrically positioned radially within the stator. The rotor core may define notches spaced around its outer circumferential surface, with salient rotor projections engaged with a respective rotor notch. The machine in such an embodiment may be a switched reluctance rotor. An electrical system using the machine and a method of manufacturing the machine are also disclosed.

17 Claims, 7 Drawing Sheets

(56) References Cited

U.S. PATENT DOCUMENTS

| | | | | |
|---|---|---|---|---|
| 10,763,772 B1* | 9/2020 | Fatemi | .................. | H02K 11/27 |
| 10,804,759 B1* | 10/2020 | Lahr | ...................... | H02K 1/146 |
| 2016/0133364 A1* | 5/2016 | Degner | .................. | H02K 15/02 |
| | | | | 310/216.067 |

* cited by examiner

ELECTRIC MACHINE CORE WITH ARCUATE GRAIN ORIENTATION

INTRODUCTION

Rotary electric machines such as electric motors and/or generators include a rotating member ("rotor") and a stationary member ("stator"). The rotor may be disposed radially within or radially outside of the stator, such that the stator respectively surrounds or is surrounded by the rotor. Rotors and stators include cylindrical cores constructed of ferrous metals such as soft magnetic steel. Such cores may be constructed from a stack of thin planar lamination layers, each of which is coated with a thin layer of insulating material. The stator core is typically connected to or formed integrally with radial stator teeth. The stator teeth are wound with copper wire or bar-type conductors, which fill slots separating adjacent stator teeth. An input voltage is applied to such stator windings from a power supply to generate a rotating magnetic field.

In a permanent magnet (PM) electric machine, rare earth magnets are arranged on and/or embedded within the individual laminations of a rotor core to provide an independent rotor field. Forces of magnetic repulsion and attraction provide a resulting push-pull effect between the rotor and stator fields, which ultimately imparts rotational forces to the rotor. Other machine types such as synchronous or switched reluctance machines forego use of such rotor magnets, and instead rely on the principles of magnetic reluctance to cause rotor poles to synchronize with the changing stator poles, thereby generating rotor rotation in a different manner.

Torque provided by the rotor of an electric machine may be usefully harnessed, for instance via gear sets and/or pulleys, and thereafter used to produce useful work in a system. For example, motor torque may be delivered to a coupled load via a drive axle, e.g., in a vehicle, powerplant, or other mobile or stationary system. When the electric machine operates as an electric generator, an internal combustion engine, turbine, or other prime mover may be used to power rotation of the rotor in order to generate current in the stator windings. The generated current is thereafter fed to a power inverter and used to charge battery cells of a battery pack and/or directly power one or more connected devices.

SUMMARY

The present disclosure relates to rotary electric machines having cylindrical stator and rotor cores. Such cores may be connected to or integrally formed with a cylindrical outer yoke or housing. The stator, and possibly the rotor in certain embodiments, includes radially-projecting teeth. The stator core and/or the rotor core, and possibly the radially-projecting teeth, are constructed from grain-oriented ferrous material. The cores, being cylindrical in shape and thus having a circular shape in plan view, i.e., as viewed along the longitudinal axis of the cores, may be formed via a spiral winding process concurrently with or subsequent to a rolling process used to orient the individual grains of the ferrous material.

The acronym "GOES" refers to grain-oriented electrical steel, i.e., electrical grades of steel or other ferrous metals, e.g., 3% silicon steel or another suitable alloy. In a typical grain-oriented ferrous material, the material's constituent crystal grains are caused to align along parallel linear axes. With cold-rolled grain-oriented steel, for instance, the grains are aligned in the rolling direction, with the grain orientation thus often described as "uni-directional" or "linear". Magnetic wall domains of the resulting material are aligned such that the ferrous material has high permeability along the direction of grain orientation. This accounts for the material's anisotropic material properties.

Higher permeability and lower losses of grain-oriented ferrous materials, such as but not limited to 3% silicon steel or other GOES materials, make sure materials useful in constructing certain types of electrical machines or devices, e.g., more efficient power transformers and rectifiers. Magnetic permeabilities of such grain-oriented ferrous materials exceed that of non-oriented ferrous materials by at least 30 percent. However, the resulting grain alignment of typical grain-oriented ferrous materials is linear along the above-noted rolling direction, as noted above. The present disclosure is therefore intended to help extend the magnetic performance benefits of grain-oriented ferrous materials to the realm of rotary electrical machines having cylindrical cores, including but not limited to concentric and cycloidal reluctance machines of the types described herein.

An example embodiment of such a rotary electric machine is disclosed herein in which a stator has stator teeth connected to a cylindrical stator core, and in which a rotor likewise has a cylindrical rotor core. In the various disclosed embodiments, the rotor is disposed radially within/circumscribed by the stator core, although the relative positioning may be reversed within the scope of the disclosure such that the stator is surrounded by the rotor. The cylindrical stator core or the cylindrical rotor core (or both) is constructed of a grain-oriented ferrous material that is wound or otherwise formed with a circular grain orientation when the core(s) are viewed along their center axes. Each respective stator tooth may be likewise constructed of grain-oriented ferrous materials having a purely linear grain orientation, e.g., 3% silicon steel.

The cylindrical stator core may define a plurality of notches spaced around an inner circumferential surface of the stator core. A tooth root of each respective stator tooth is engaged within a respective one of the notches of the stator core.

In an optional configuration, the rotor is eccentrically positioned radially within the stator. The rotary electric machine may be embodied as a cycloidal reluctance motor in such a configuration.

The rotor may also include rotor teeth. In such an embodiment, the rotor core may define a plurality of notches spaced around an outer circumferential surface of the rotor core. A tooth root of each respective rotor tooth is engaged within a respective one of the notches of the rotor. An electric machine having such a rotor may be optionally configured as a switched reluctance motor.

Additionally, an electrical system is disclosed herein that includes a rotary electric machine electrically driven via a voltage from the power supply. The electric machine includes a rotor having a cylindrical rotor core, and a stator having a plurality of stator teeth connected to a cylindrical stator core. The cylindrical stator core and/or the cylindrical rotor core is constructed of grain-oriented ferrous materials having a circular grain orientation. A load is coupled to and driven by the rotor when the stator is energized by the power supply.

Also disclosed herein is a method of constructing a cylindrical core. The method may include providing an elongated strip of grain-oriented ferrous material having a linear grain orientation along a plane of the elongated strip, and then winding the strip of grain-oriented ferrous material into one or more circular turns each having a circular or arcuate grain orientation to thereby form the cylindrical core. Winding may include spirally-winding the strip to form a helical coil having a plurality of circular turns, and then joining the circular turns together to form the cylindrical core.

The method may include providing radially-projecting teeth having a linear grain orientation, and then connecting the radially-projecting teeth to the cylindrical core such that the linear grain orientation is radial with respect to a center axis of the cylindrical core.

The method may additionally include positioning the cylindrical core having the radially-projecting teeth with respect to an additional cylindrical core, such that the cylindrical core and the additional cylindrical core are eccentrically positioned with respect to each other.

Some embodiments the present method include connecting stator teeth to the stator core and positioning the rotor core radially within the stator core, such that the stator teeth project radially toward the rotor core. The stator teeth, and/or optional rotor teeth, may be optionally constructed from grain-oriented steel having a linear or radial grain orientation with respect to a center of the cylindrical stator core.

Positioning the cylindrical rotor core radially within the stator core may optionally include positioning the rotor core eccentrically within the stator core. In such an embodiment, the rotor is configured to move with two degrees of freedom, i.e., rotating motion about a rotary axis of the rotor and orbiting motion about a center axis of the stator.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 1:
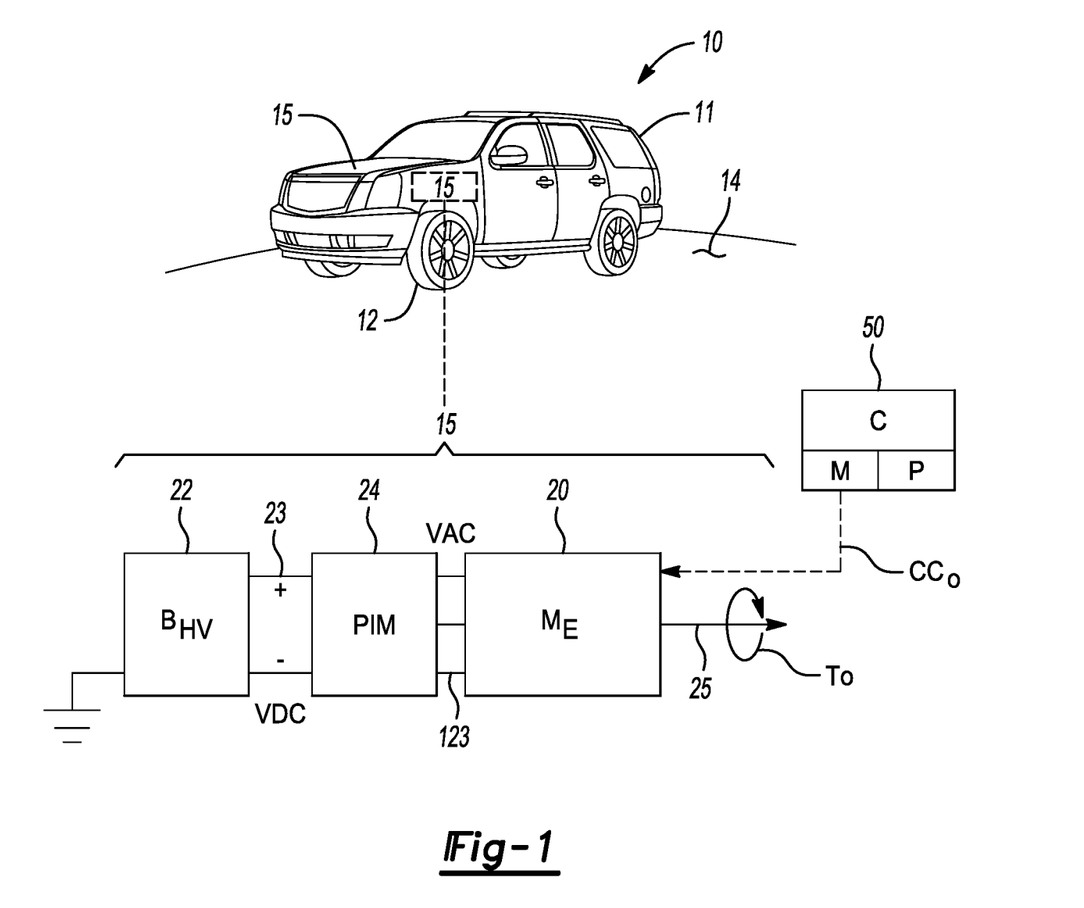
FIG. 1 is a schematic illustration of an example vehicle having an electrical system that includes a rotary electric machine constructed using grain-oriented ferrous materials as set forth herein.

Referring to the drawings, wherein like reference numbers refer to the same or like components in the several Figures, an electrical system 15 is shown schematically in FIG. 1. The electrical system 15 described herein may be used as part of a vehicle 10 having a vehicle body 11, e.g., a motor vehicle having a set of road wheels 12 in rolling contact with a road surface 14. The electrical system 15 may also be used in other types of vehicles 10, for instance aircraft, watercraft, and rail vehicles, or in other mobile, non-vehicular applications such as robots and mobile platforms. Stationary applications may likewise benefit from use of the electrical system 15 described below, and therefore the vehicle 10 of FIG. 1 is just one possible beneficial application of the present teachings.

The electrical system 15 includes a rotary electric machine ($M_E$) 20. As will be appreciated by those of ordinary skill in the art, rotary electric machines such as the example electric machine 20 have cylindrical stator and rotor cores. Benefits of grain-oriented ferrous materials are described above. However, such benefits are not readily extendable to such cores and other cylindrical structure given the linear orientation of the material along the direction of cold-rolling. The present disclosure is therefore directed toward enabling construction of rotary electric machines having cores constructed of such grain-oriented ferrous materials, and in particular to cores requiring a circular and/or radial grain/crystal orientation.

The rotary electric machine having such grain orientation may be optionally enhanced using linear or radial grain-oriented materials in other components, e.g., radially-projecting stator and/or rotor teeth. Approaches suitable for constructing the electric machine 20 using such grain-oriented ferrous materials are described below with reference to FIGS. 2-6. The present disclosure may be applied to advantage in different types of motors and generators, including but not necessarily limited to synchronous motors, inductions motors, and direct current (DC) motors.

Figure 3:
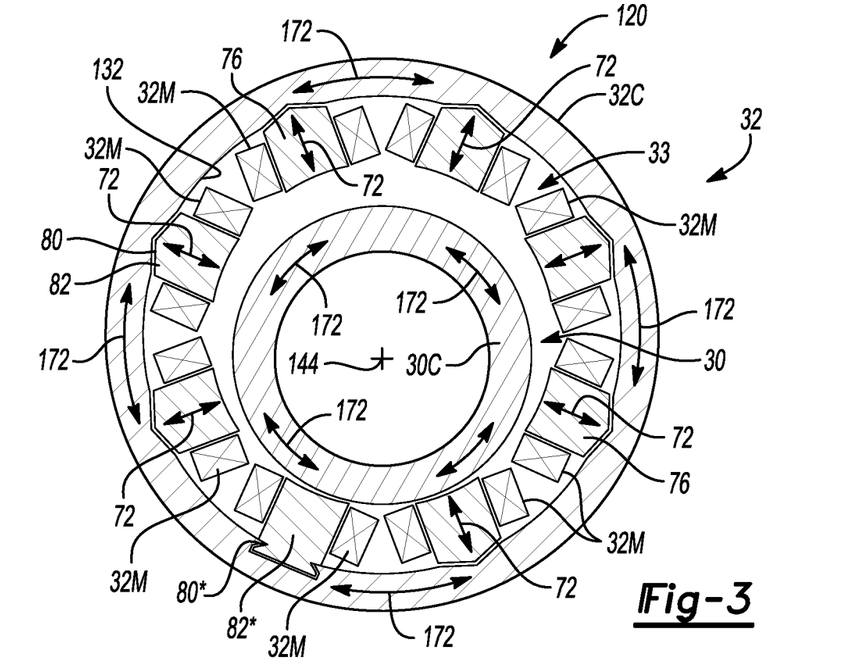
FIGS. 3 and 4 are schematic illustrations of cycloidal and non-cycloidal example variations of the rotary electric machine shown in FIG. 1, with cores and stator teeth constructed according to the present disclosure.
Figure 4:
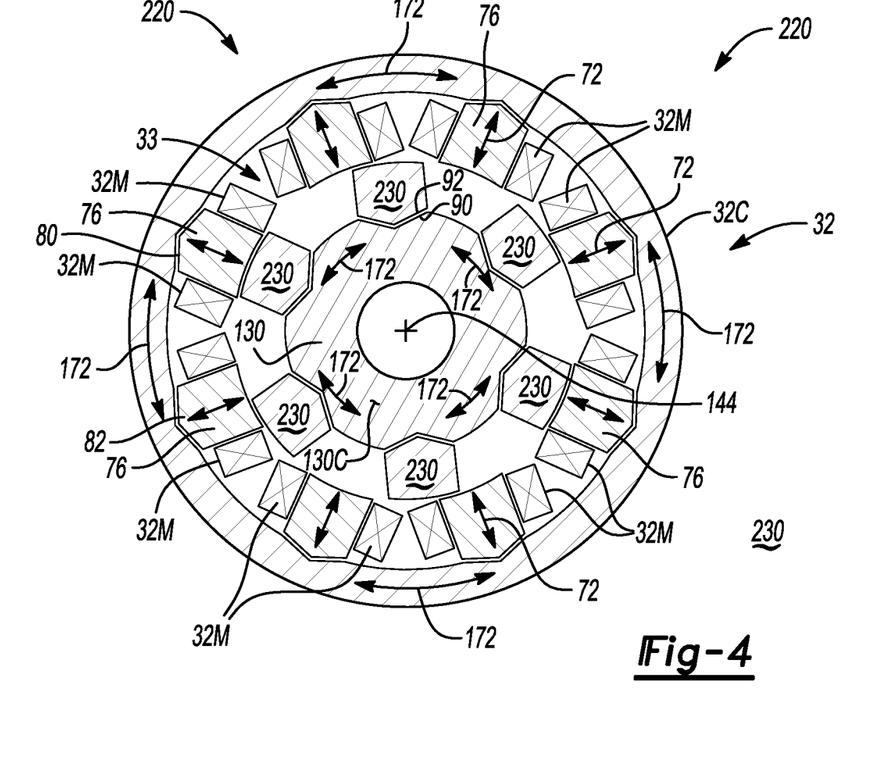
Figure 6:
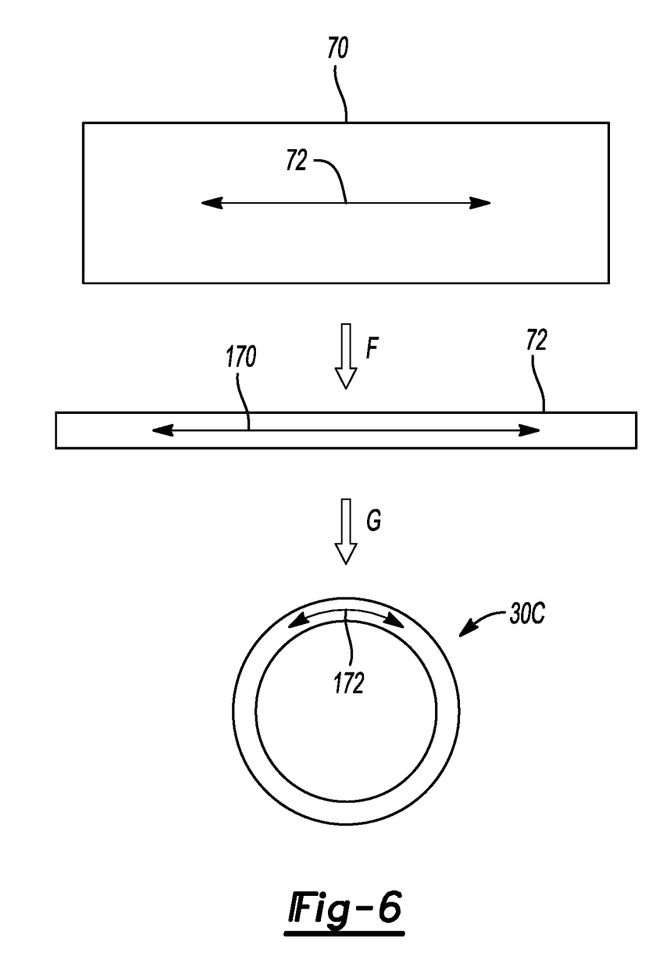
FIGS. 6-8 illustrate an example approach for manufacturing a rotor having rotor teeth and a core with a circular or arcuate grain orientation.

Further with respect to the example electrical system 15 of FIG. 1, the rotary electric machine 20 includes an output member 25 coupled to a cylindrical rotor 30 or 130 (see FIGS. 3, 4, and 6). The electrical system 15 in the illustrated embodiment also includes a power supply, shown as a representative battery ($B_{HV}$) 22, and a power inverter module (PIM) 24. Such a PIM 24 may be omitted when the electric machine 20 is a DC machine. The battery 22 may have a relatively high voltage capacity in some embodiments, e.g., 60-volts or more depending on the embodiment, with "high-voltage" indicated by subscript "HV". The electric machine 20 may be optionally embodied as a polyphase electric motor, and thus electrically connected to an AC bus 123, with the electric machine 20 in such an embodiment energized by an AC voltage (VAC) from the PIM 24. The PIM 24 in turn is connected to the battery 22 via positive (+) and negative (−) rails of a DC voltage bus 23, with a DC voltage (VDC) supplied by the DC voltage bus 23 to the PIM 24 and vice versa depending on whether the electric machine 20 functions as a motor or as a generator.

When energized, the rotary electric machine 20 generates and outputs the above-noted output torque (arrow $T_O$) to a driven load via the output member 25, for instance to a connected drive axle and/or the drive wheels 12 of the vehicle 10. Operation of the electrical system 15 may be regulated by a controller (C) 50 via control signals (arrow $CC_O$). The controller 50 may include a processor (P) and tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

The above-noted cores and possibly other structure of the electric machine 20 are constructed herein from grain-oriented ferrous materials, such as but not limited to cold-rolled 3% silicon steel, to provide cylindrical structure with a functionally desirable circular grain or crystal orientation. A method 100 is shown schematically in FIG. 2 for constructing such cores. In general, the method 100 enables construction of the rotary electric machine 20 having cylindrical stator and rotor cores 32C and 30C, respectively. The method 100 may include forming, stamping, or otherwise providing elongated strips 170 of grain-oriented ferrous material having the linear grain orientation along a particular plane of the strip 170, as shown schematically in FIG. 2. Such elongated strips 170 may be formed in a separate process, e.g., via laser cutting, stamping, or punching of a larger sheet 70 of grain-oriented ferrous materials, or may be formed directly by cold rolling cylindrical wires into such strips 170. The strips 170 are then, in a non-limiting embodiment, spirally-wound into the helical coil 74 shown in FIG. 2, which as shown includes plurality of circular layers or turns 74N, with each circular turn 74N having a circular or arcuate grain orientation (arrows 172) along a plane of the respective circular turn 74N. The circular turns are thereafter welded, bonded, or otherwise joined together to form the cylindrical stator core 32C or the cylindrical rotor core 30C. As shown in FIGS. 6-9, other processes may be used to form the cores 30C and/or 32C with an annular shape, and therefore the helical coil 74 is just one possible approach.

Figure 2:
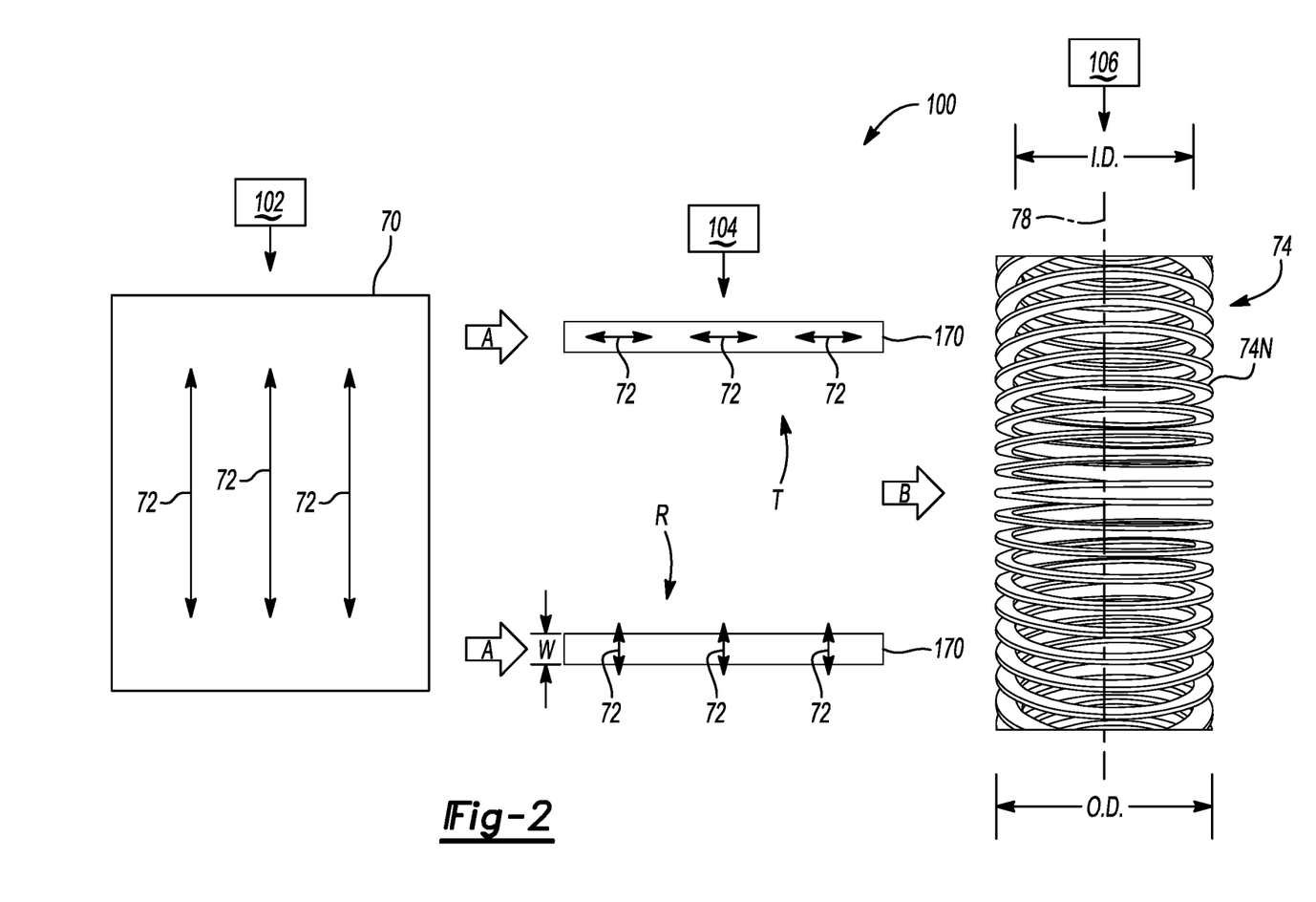
FIG. 2 is a schematic flow diagram of a method for manufacturing a cylindrical core from grain-oriented ferrous materials for use in the rotary electric machine shown in FIG. 1.

The method 100 in an exemplary embodiment commences at step 102. In this step, a metal sheet 70 is constructed of a suitable grain-oriented ferrous material by rolling, forming, or otherwise providing a raw blank of such material with a linear grain orientation (arrows 72). When the sheet 70 is cold-rolled, for instance, the rolling direction corresponds to the direction of grain orientation. Step 102 may entail cold-rolling silicon steel, for example, until the sheet 70 obtains an application-suitable level of linear grain alignment. The method 100 then proceeds to step 104, as indicated by arrows A.

Step 104 includes cutting the metal sheet 70 from step 102 into the elongated strips 170 each of width (W). The strips 170 may be cut and oriented relative to the direction of arrows 72 at step S102 to provide the linear grain orientation in a tangential (arrow T) or radial (arrow R) direction depending on the application, with "tangential" and "radial" referring to relative directions once the strips 170 are spirally-wound into a circular shape. The strips 170 are then fed into step 106 as indicated by arrow B. In other embodiments, cylindrical wires of non-oriented ferrous materials may be rolled and flattened into the strips 170 directly, which in turn potentially avoids the need for cutting of the sheets 70 into the strips 170 in step 102.

At step 106, the strips 170 provided from step S104 are spirally wound or otherwise formed into a helical coil 74 having an internal diameter (I.D.), an outer diameter (O.D.), and a coil axis 78. Such a coil 74 may be produced, for example, by winding the strips 170 around a cylindrical mandrel (not shown). As will be appreciated, when stood on end the coil 74 will tend to compress under gravity. Such compression may be assisted by an external force as needed, such as via a press plate (not shown). Once compressed to cylindrical form, the repeating turns of the coil 74 may be formed into a unitary cylindrical core, e.g., via welding, bonding, and/or end plates (not shown) used to retain the coil 74 as a solid unitary structure, with such a core thereafter used in the construction of the rotary electric machine 20.

FIGS. 3 and 4 depict alternative embodiments of the rotary electric machine 20 of FIG. 1 as a cycloidal reluctance machine 120 (FIG. 3) and a switched reluctance machine 220 (FIG. 4). In the example embodiment of FIG. 3, the stator 32 is segmented into a cylindrical stator core 32C and a plurality of radially-projecting stator teeth 76. The stator teeth 76 are equally-spaced around an inner circumferential wall 132 of the stator core 32C and project radially toward a rotor core 30C. Stator slots 33 defined between adjacent stator teeth 76 contain stator electromagnets 32M, which in turn may be formed by winding lengths of conductive wires around the stator teeth 76, or by filling the stator slots 33 with lengths of bar-style conductors, as will be appreciated by those having ordinary skill in the art.

In a possible embodiment, the stator core 32C and the rotor core 30C are both constructed from grain-oriented ferrous materials, e.g., using the method 100 of FIG. 2. As a result, most or all of the rotor core 30C and the stator core 32C has a circular or arcuate grain orientation direction (arrows 172), i.e., when the stator core 32C and rotor core 30C are observed in plan view, the grain orientation is annular. The stator tooth 76 may be segmented to allow winding of the stator teeth 76 before assembling the stator 32, thereby increasing the fill factor of the stator slots 33 and enhancing design modularity.

Notches 80 may be formed in the stator core 32C to form an interlocking feature, such that a mating tooth root 82 of each stator tooth 76 can be inserted into and thereby engage with the stator core 32C. While the notches 80 and tooth roots 82 are shown as a simple V-shaped recess and wedge for simplicity and illustrative clarity, and are shown spaced a short distance apart from the inner circumferential wall 132, different structure may be used for mechanical attachment to provide sufficient structural integrity. For instance, the tooth roots 82 and notches 80 may have a more complex, application-suitable interlocking profile, for instance the alternative tooth root 82\* and mating notch 80\* shown at lower left in FIG. 3, with no or virtually no space between the tooth root 82\* and the stator core 32C defining the mating notch 80\*. The tooth roots 82\* are thus configured to form a secure mechanical interlock when mated to the notches 80\*, with various other interlocking shapes or profiles contemplated within the scope of the disclosure. Such profiles thus allow retention of the stator tooth 76 without resorting to the use of additional fixtures. The tooth roots 82 or 82\* in some embodiments may extend up to about halfway into the stator core 32C to assist in retention.

In the illustrated embodiment of FIG. 3, the rotor core 30C has a center axis 144 with respect to which the rotor 30 rotates as one of two degrees of freedom (2DOF) of motion. Center axis 144 is not concentric with a center axis of the stator 32, however, and therefore the resulting construction is eccentric or cycloidal. An example schematic configuration and further operational description of the cycloidal electric machine 120 of FIG. 3 is described below with reference to FIG. 9.

FIG. 4 shows a switched reluctance machine 220 embodiment of the rotary electric machine 20 depicted in FIG. 1. The structural composition of the stator 32 may be the same as that which is used in constructing the cycloidal electric machine 120 of FIG. 4. The rotor 130 includes a rotor core 130C having a lobed profile. That is, the rotor core 130C defines equally-spaced notches 90, possibly similar or identical in construction to the above-described notches 80 of the stator core 32C. Salient rotor projections 230 having a mating root 92 are inserted into the notches 90 to thereby engage the rotor core 130C. During rotation of the rotor 130 in the presence of energized stator electromagnets 32M, the rotor projections 230 magnetize via the principle of magnetic reluctance to form salient magnetic poles, with magnetic poles of the stator 32 leading such salient rotor poles to ensure sustained rotation of the rotor 130.

Figure 5:
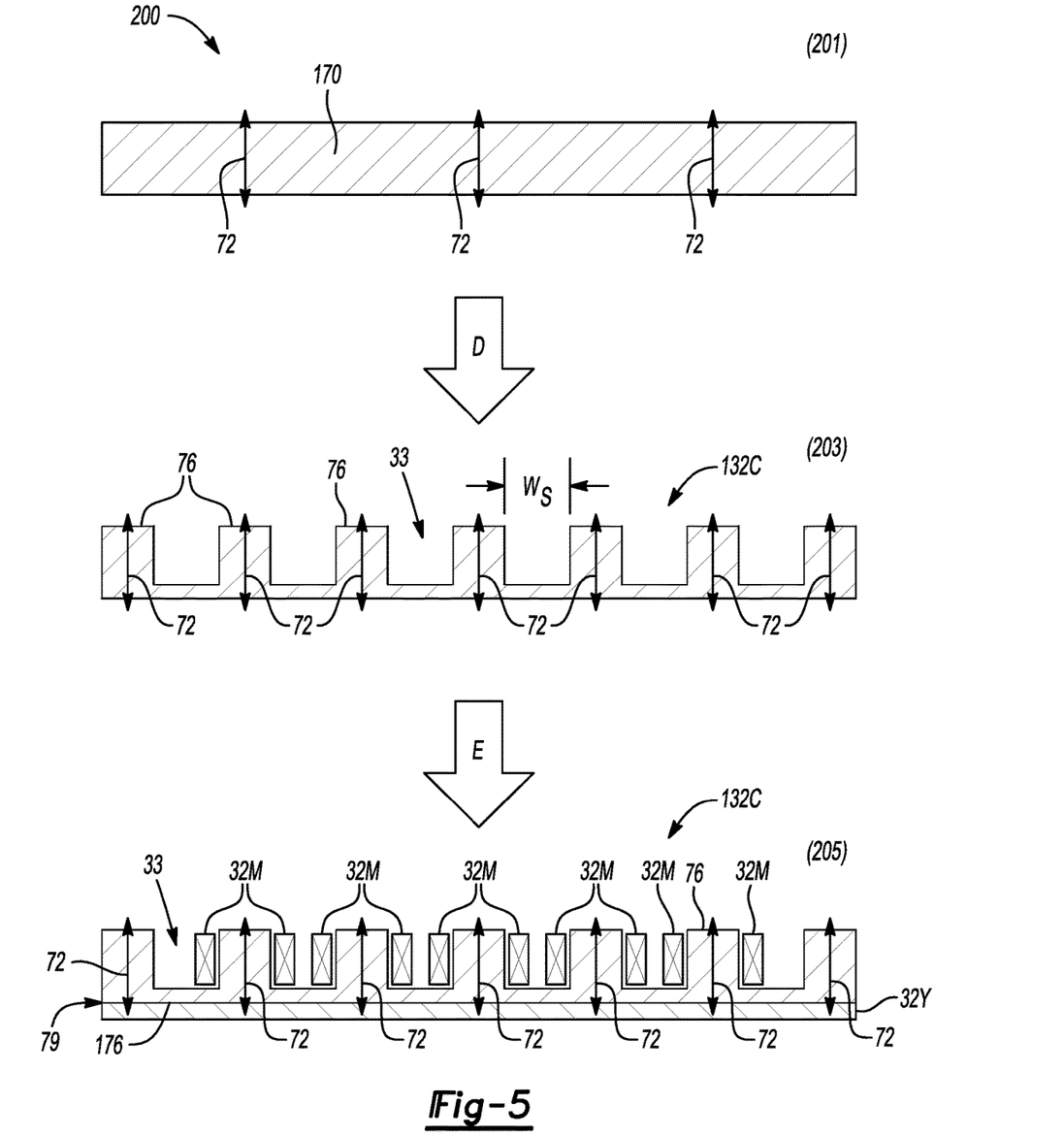
FIG. 5 is a schematic flow diagram of an example method for manufacturing the stator teeth shown in FIGS. 3 and 4.

FIG. 5 illustrates an optional method 200 for constructing a stator core 132C integrally with the stator teeth 76. Such a configuration may eliminate the need for the above-described notches 80, and therefore may help simplify manufacturing of the stator 32. At step 201, a sheet 70 of grain-oriented ferrous material is formed with the predetermined linear grain orientation (arrows 72). As noted above, application-suitable, grain-oriented materials, possibly including 3% silicon steel, may be cold-rolled or otherwise formed with the desired linear grain orientation indicated by arrows 72. Forming of the sheets 70 could include one to several bends and a stack-up of similarly-constructed sheets 70 in order to form a ring. The sheets 70 are thereafter supplied to step 203, as indicated by arrow D.

At step 203, stator slots 33 separated from each other by a slot width ($W_S$) may be introduced to the sheets 70 before forming individual laminations of the stator 32. Such slots 33 may be punched, laser cut, or otherwise formed in the sheets 70. Once the stator slots 33 have been formed, the stator core 132C progresses to step 205 as indicated by arrow E.

At step 205, the stator teeth 76 are stacked and then wound with lengths of copper wire or another suitable electrically conductive material to form the stator electromagnets 32M. A flat surface 79 present opposite the stator teeth 76 may be bonded or otherwise joined to a stator yoke 32Y to form the stator 32. As will be appreciated, a stator yoke, such as the stator yoke 32Y, is a cylindrical frame forming supporting structure for the stator core 132C, the stator teeth 76, and the stator electromagnets 32M. Such a stator yoke 32Y may be integral with the illustrated stator core 132C.

Thus, a method of constructing the rotary electric machine 20 in its various embodiments will be readily appreciated by one of ordinary skill in the art in view of the above disclosure. Such a method may include forming the cylindrical stator and rotor cores 32C and 30C, one or both of which may be constructed from gain-oriented, spirally-wound ferrous materials having the above-described circular grain orientation according to the example method 100 of FIG. 2. Thereafter, the plurality of radially-projecting stator teeth 76 may be connected to the cylindrical stator core 32C, e.g., by inserting the tooth roots 82 of the stator teeth 76 into the mating notches 80 of FIGS. 3 and 4 or attaching the stator core 132C of FIG. 5 to a cylindrical stator yoke 32Y, which itself may be constructed from grain-oriented ferrous materials with the circular grain orientation noted above. Such a method may further include positioning the cylindrical rotor core 30C radially within the cylindrical stator core 32C such that the stator teeth 76 project toward the cylindrical rotor core 30C. Optionally, one may construct the stator teeth 76 from grain-oriented steel having a linear grain orientation (arrows 72) as shown in FIGS. 3 and 4.

FIGS. 6-9 illustrate an approach for manufacturing a rotor 430 (FIG. 8) having rotor teeth 30T, with the approach also possibly used to manufacture a stator, as will be readily appreciated in view of the following description. In FIG. 6, a sheet 70 of grain-oriented ferrous material having a linear grain orientation (arrow 72) is fed (arrow F) into a stamping press (not shown) and subjected to a stamping process. An elongated strip 170 having the grain orientation (arrow 72) is then fed into a forming process, e.g., similar to processes used to form snap rings and other annular metal structures. The resulting grain orientation of the rotor core 30C is thus circular or arcuate, as indicated by arrow 172, in a manner similar to the construction depicted in FIG. 3.

Figure 9:
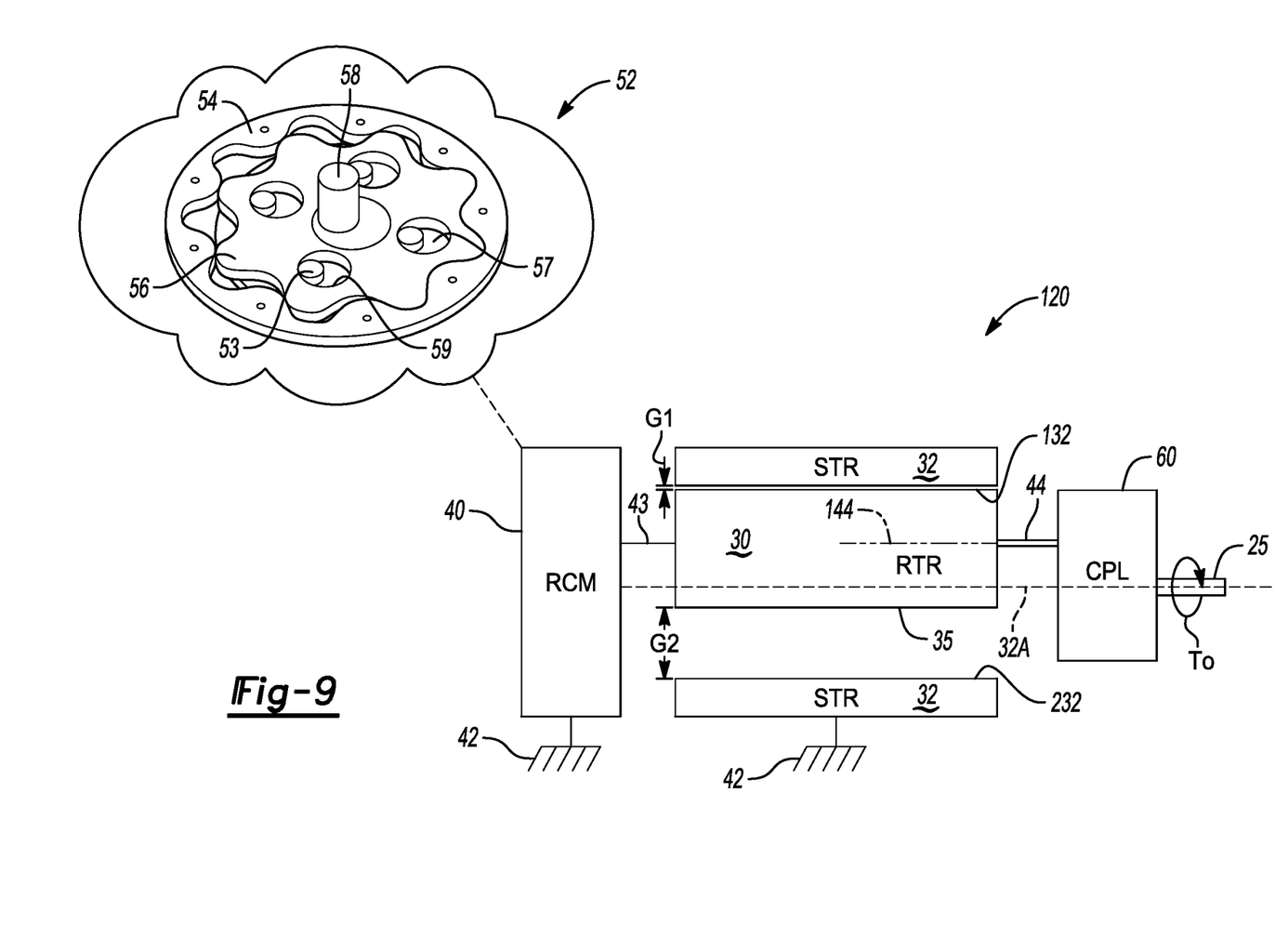
FIG. 9 is a schematic illustration of an optional cycloidal construction of the rotary electric machine, with integral or separate cycloidal gear set features shown via an inset, that is usable as part of the electrical system shown in FIG. 1.

In another process, a sheet 70A of grain-oriented ferrous material having a linear grain orientation (arrow 72), orthogonal to the orientation used to form the rotor core 30C of FIG. 6, is fed (arrow H) to a stamping press (not shown) and subjected to a stamping process to form a stamped sheet 170A. The stamping process forms rotor teeth 30T with the linear grain orientation (arrow 72), and with a relatively thin rotor yolk or bridge 30Y joining the adjacent rotor teeth 30T. Such a process is akin to that used in step 203 of FIG. 5. Thereafter, the stamped sheet 170A is fed (arrow I) into a forming process such as that used in FIG. 6 to form an annular rotor assembly 330 having radially-projecting rotor teeth 30T. As depicted in FIG. 9, the annular rotor assembly 330 is thereafter combined with the rotor core 30C, e.g., via circumferential welding or bonding, to thereby form the rotor 430, with rotor 430 having the rotor core 30C with circular/arcuate grain orientation (arrow 172) and rotor teeth 30T having a linear or radial grain orientation.

Figure 7:
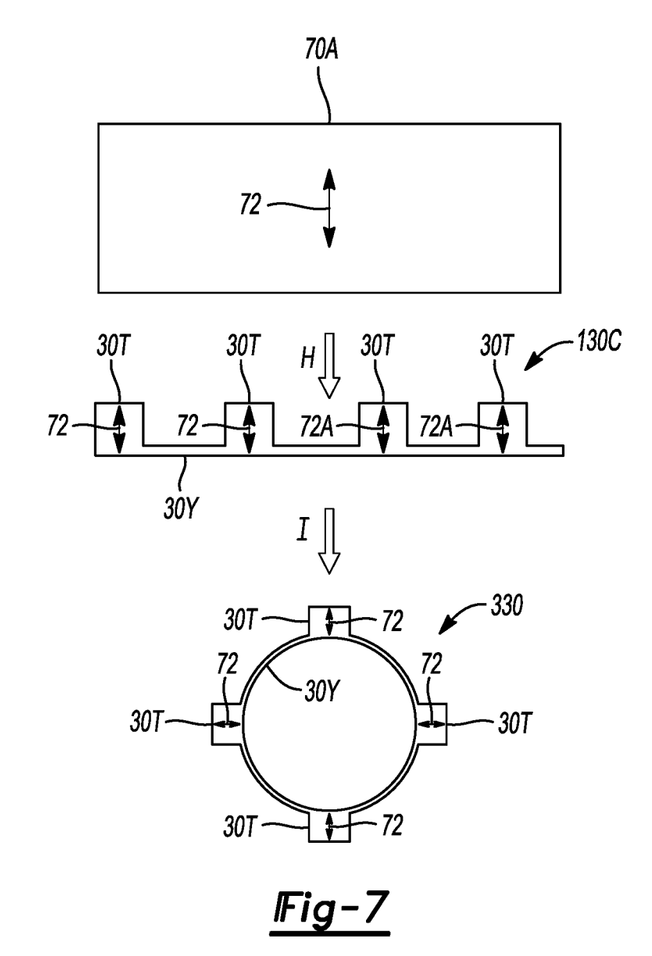
Figure 8:
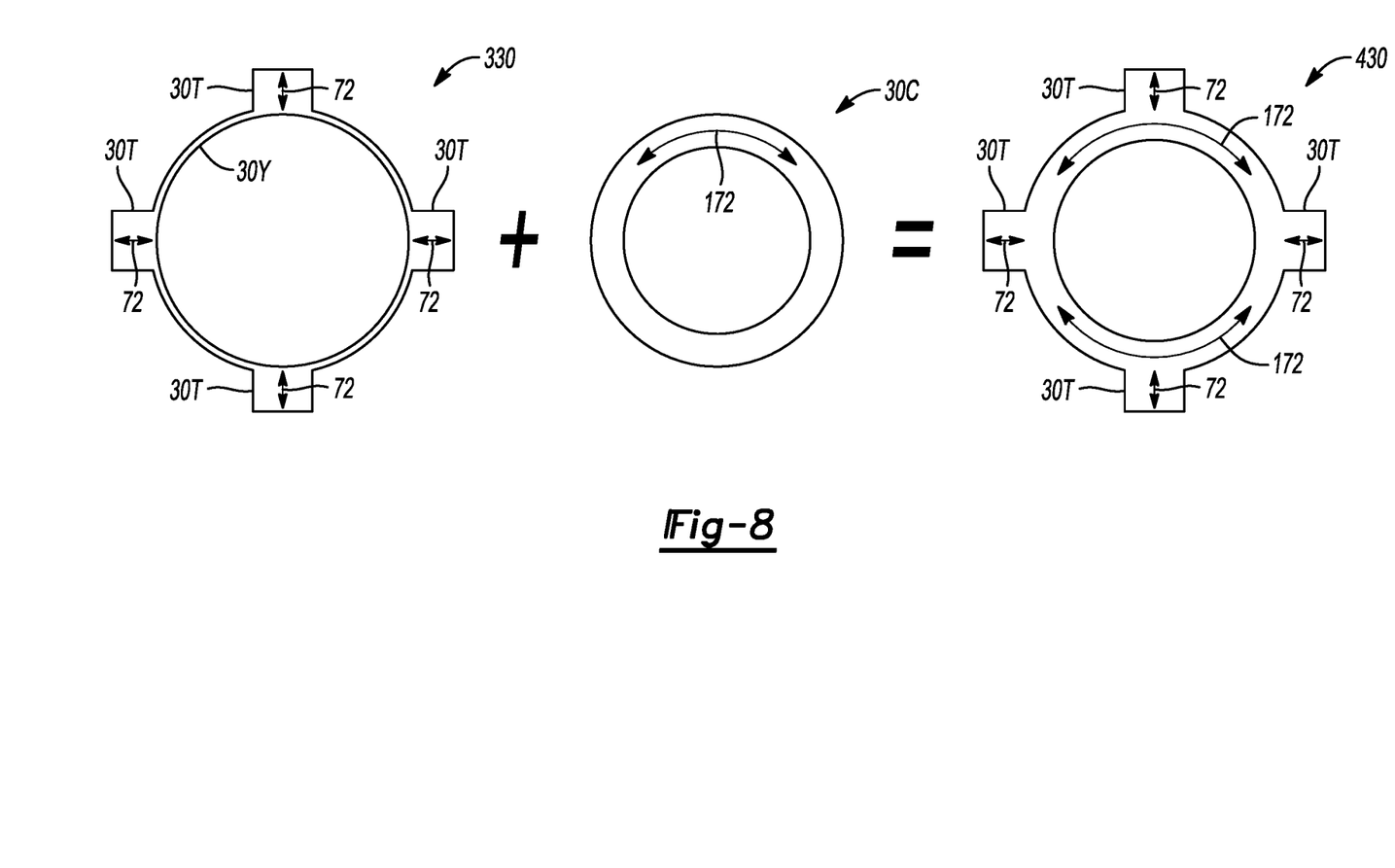

Thus, one of ordinary skill in the art will appreciate that a cylindrical core of a rotary electric machine is enabled by providing the elongated strip 170 of grain-oriented ferrous material having the above-described linear grain orientation (arrows 72) along a plane of the elongated strip 170, and then winding the strip 170 into one or more circular turns, e.g., turns 74N of FIG. 2 or a single turn in FIGS. 6-8, each having a circular or arcuate grain orientation (arrows 172) along a respective plane of the one or more circular turns. Winding the strip 170 may optionally include spirally-winding the strip 170 to form the helical coil 74 of FIG. 2, i.e., having a plurality of circular turns 74N, and then joining the circular turns 74N together to form the cylindrical core. For the stator core 32C or rotor core 30C, or both, one may provide radially-projecting teeth having the linear grain orientation (arrow 72), and connect the teeth to the cylindrical core such that the linear grain orientation is radial with respect to a center axis of the cylindrical core. For the embodiment of FIG. 9, such a cylindrical core having such radially-projecting teeth may be positioned with respect to an additional cylindrical core, such that the cylindrical core and the additional cylindrical core are eccentrically positioned with respect to each other.

Referring to FIG. 9, for instance, the rotor (RTR) 30 of the cycloidal electric machine 20 may be eccentrically-positioned. The rotor 30, with arranged permanent magnets thereof shown in FIGS. 5-9, is radially disposed with respect to the stator (STR) 32, which may be grounded to a stationary member 42 as shown. The electric machine 20 may include a housing (not shown) in which the rotor 30, the stator 32, and other components are disposed and structurally supported. The stator 32 may be separated from the rotor 30 by an airgap (G1, G2), or the stator 32 may be in continuous contact with the rotor 30 at the instantaneous center of motion without sliding against an outer surface 35 of the rotor 30. The eccentric positioning of the rotor 30 provides the rotor 30 with the above-noted 2DOF, i.e., rotating motion and orbiting motion.

The rotor 30 is eccentrically-positioned and disposed radially within the stator 32, i.e., surrounded or circumscribed by the stator 32 in the schematically-illustrated example cylindrical embodiment of FIG. 2. The rotor 30 moves with rotating motion about a rotor axis 144, and orbiting motion around a center axis 32A of the stator 32, with the center axis 32A also referred to herein as the stator axis 32A. The rotor 30 and stator 32 may be mutually-separated from each other in some configurations by an airgap (G1 or G2). That is, depending on the orbiting position of the rotor 30 within the stator 32, the rotor 30 may be closer to the inner circumferential wall 132 at a different part of the stator 32, shown in FIG. 2 as corresponding airgap G1, at which position the rotor 30 is farther away from a bottommost part 232 of the inner circumferential wall 132, with the larger corresponding airgap G2. As the rotor 30 orbits within the stator 32, the relative size of airgaps G1 and G2 will change, i.e., the airgap G2 becomes smaller than the airgap G1 whenever the rotor 30 orbits 180-degrees away from the position depicted in FIG. 2. The airgap G1, G2 may be zero in other embodiments, e.g., when a multi-lobed cycloidal disc 56 is integrated into the structure of the rotor 30 as described below.

The electric machine 20 is connected to or includes a rotor constraint mechanism (RCM) 40. The RCM 40 is configured to constrain motion of the rotor 30 such that the rotor 30 is able to generate useful application-specific torque on a coupled load. In certain embodiments, portions of the RCM 40 may be integrally formed with the structure of the rotor 30, while in other embodiments the RCM 40 may be embodied as an external set of components, e.g., portions of a cycloidal gear set 52 powering an output shaft 58. The output shaft 58 rotates in a direction opposite to that of the rotor 30, as will be appreciated.

General operation of the electric machine 20 may be understood with reference to the cycloidal gear set 52 shown as an inset in the upper left corner of FIG. 2. The cycloidal gear set 52 has a grounded/stationary outer ring gear element 54, within which is disposed the cycloidal disc 56. The cycloidal disc 56 defines equally-spaced holes 59. Pins 53, e.g., cylindrical posts as shown, may axially-extend from a gear element 57. The particular 2DOF motion enabled by the cycloidal gear set 52 will be appreciated by one of ordinary skill in the art, e.g., as a speed reduction mechanism.

The electrical system 15 shown in FIG. 1 may bodily incorporate certain structural functional aspects of the example cycloidal gear set 52 into its constituent structure without bodily incorporating the cycloidal gear set 52 itself. For instance, the function of the stationary outer ring gear element 54 and the cycloidal disc 56 may be combined into the structure and function of the RCM 40, with an input member 43 of the rotor 30 bolted to structure of the RCM 40 corresponding to the cycloidal disc 56. Such structure enables the rotor 30 to be constrained so as to rotate about the rotor axis 144 and, at the same time, to orbit about the stator axis 32A.

The disclosed arrangement uses a rotor magnetic field to produce higher levels of output torque (arrow $T_O$) from the electric machine 20. At least part of the RCM 40 may be integrally formed with the rotor 30 in certain embodiments.

For instance, a profile of the rotor 30 may be constructed to approximate or match a profile of the illustrated cycloidal disc 56 of the example cycloidal gear set 52, with the stator 32 being similarly constructed to form the mating profile of the outer ring gear element 54.

The rotor 30 and/or the electric machine 20 may be optionally connected to a coupling mechanism (CPL) 60. The CPL 60 is configured to translate rotation of the rotor 30 from the rotor axis 144 to a driven load. The CPL 60 may be positioned downstream of the rotor 30, i.e., coupled to the output member 44 of the rotor 30 and configured to translate the 2DOF motion of the rotor 30 into 1DOF motion. As used herein, the term "1DOF motion" describes rotation of the output member 25 and a connected driven load without orbiting motion. So, when the driven load is the above-noted drive axle or road wheels 12 of the representative vehicle 10 shown in FIG. 1, the 1DOF motion of the rotor 30 powers the drive axle.

Various embodiments may be envisioned for implementing the CPL 60, including but not limited to an Oldham coupling mechanism. As will be appreciated, Oldham couplings utilize a compact arrangement of discs, i.e., an input-coupled disc, an output-coupled disc, and a rotating middle disc joined to the input- and output-coupled discs by a mating tongue-and-groove connection. Alternatively, the post-and-hole configuration shown in the cycloidal gear set 52 of FIG. 2 may be used, or a gear train constructed of multiple spur gears may be employed to the same ends, with these being just a few possible ways to implement the CPL 60.

As disclosed above, use of the CPL 60 within the example electrical system 15 of FIG. 1 is optional. That is, certain applications may be readily envisioned that make beneficial use of orbiting motion of the output member 25. An example is that of a mixing operation in which simultaneous rotation and orbiting motion may be desirable, e.g., when powering beaters of the type used to mix cement or to blend a food product. Other possible applications may find such 2DOF motion to be beneficial, such as in the propulsion systems of unmanned rovers or other special purpose vehicles, or in grinders, mixers, and washing machines.

With respect to optional eccentricity, the rotor is radially-separated from the surrounding stator by an airgap. The size of the airgap varies in conjunction with the orbiting position of the rotor relative to the stator. The electric machine described herein is thus "cycloidal" in the sense that the rotor is constrained to move with two degrees of freedom (2DOF): (1) rotary motion about the rotor's axis of rotation, and (2) orbiting motion about the stator's axis. For a typical rotary electric machine, the electromagnetic torque that is present within the above-noted airgap may be derived according to the following equation [1], with t and r respectively denoting radial and tangential torque components in an example cylindrical coordinate system:

$$T_e = F_t R L_{ef} \qquad [1]$$

In equation [1], $T_e$ is the electromagnetic torque in newton-meters, R is the average radius of the airgap in meters, $L_{ef}$ the effective stack length of the active materials of the electric machine, also in meters, and $F_t$ is the tangential forces present within the airgap in newtons. The tangential forces, $F_t$, are defined as:

$$F_t = \frac{P}{2} \int_0^{2\pi} f_t(\phi_r) R d\phi_r \qquad [2]$$

where P is the number of poles of the electric machine, $f_t$ represents the tangential component of the airgap force density per unit length, and $\phi_r$ is the electrical angle covering each pole pair in radians.

According to the relationships expressed in the above-noted equations [1] and [2], the radial airgap forces, which are several times larger than the machine's tangential forces, do not contribute to the output torque of the electric machine. The disclosed embodiments of the cycloidal electric machine therefore incorporate otherwise unused radial airgap forces into the machine's output torque so as to realize certain performance advantages, including enabling output of higher levels of motor torque at lower motor speeds.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A rotary electric machine, comprising:
   a stator having a cylindrical stator core and a plurality of stator teeth connected to and radially-projecting from the cylindrical stator core;
   a rotor surrounded by the stator and having a cylindrical rotor core, wherein the rotor is eccentrically positioned radially within the stator such that the rotary electric machine is a cycloidal electrical machine having two degrees of freedom of motion, and wherein one or both of the cylindrical stator core and the cylindrical rotor core is constructed of a grain-oriented ferrous material having a circular or arcuate grain orientation; and
   a rotor constraint mechanism connected to the rotor and configured to constrain motion of the rotor to thereby enable the rotor to generate and transmit output torque to a load in at least one of the two degrees of freedom of motion.

2. The rotary electric machine of claim 1, wherein the cylindrical stator core and the cylindrical rotor core are both constructed of the grain-oriented ferrous material.

3. The rotary electric machine of claim 1, wherein each respective stator tooth of the plurality of stator teeth is constructed of a grain-oriented ferrous material having a linear or radial grain orientation with respect to a center axis of the cylindrical stator core.

4. The rotary electric machine of claim 1, wherein the cylindrical stator core defines a plurality of notches spaced around an inner circumferential surface of the cylindrical stator core, and wherein each respective stator tooth of the plurality of stator teeth is engaged with a respective one of the plurality of notches.

5. The rotary electric machine of claim 1, wherein the cycloidal electric machine is a cycloidal reluctance motor.

6. The rotary electric machine 1, the rotor having a plurality of salient rotor projections, wherein the cylindrical rotor core defines a plurality of notches spaced around an outer circumferential surface of the cylindrical rotor core, and wherein each respective rotor projection of the plurality of salient rotor projections is engaged with a respective one of the plurality of notches of the rotor.

7. The rotary electric machine of claim 1, wherein the rotor includes a plurality of rotor teeth constructed of the grain-oriented ferrous material having a linear or radial grain orientation with respect to a center axis of the cylindrical rotor core.

8. An electrical system comprising:
   a power supply; and
   a rotary electric machine electrically driven via a voltage from the power supply, and having:
   a rotor having a rotary axis and a cylindrical rotor core;
   a stator having a center axis, a cylindrical stator core, and plurality of stator teeth connected to and radially-projecting from the cylindrical stator core, wherein at least one of the cylindrical stator core and the cylindrical rotor core is constructed of a grain-oriented ferrous material having a circular or arcuate grain orientation; and a load coupled to and configured to be driven by the rotor when the stator is energized by the power supply, wherein the rotor is eccentrically positioned radially within the stator such that the rotary electric machine is a cycloidal electrical machine having two degrees of freedom of motion, including rotating motion about the rotary axis of the rotor and orbiting motion about the center axis of the stator; and
   a rotor constraint mechanism connected to and configured to constrain motion of the rotor to enable the rotor to generate and transmit output torque to a load in at least one of the two degrees of freedom of motion.

9. The electrical system of claim 8, wherein the cylindrical stator core and the cylindrical rotor core are both constructed of the grain-oriented ferrous material.

10. The electrical system of claim 8, wherein each respective stator tooth of the plurality of stator teeth is constructed of a grain-oriented ferrous material having a linear grain orientation.

11. The electrical system of claim 8, wherein the cylindrical stator core defines a plurality of notches spaced around an inner circumferential surface of the stator core, and wherein each respective stator tooth of the plurality of stator teeth is engaged with a respective one of the plurality of notches.

12. The electrical system of claim 8, the rotor including a plurality of salient rotor projections, wherein the cylindrical rotor core defines a plurality of notches spaced around an outer circumferential surface of the cylindrical rotor core, and wherein each respective rotor projection of the plurality of salient rotor projections is engaged with a respective one of the plurality of notches of the cylindrical rotor core.

13. The electrical system of claim 8, wherein the rotor includes a plurality of rotor teeth constructed of a grain-oriented ferrous material having a linear or radial grain orientation with respect to the rotary axis of the rotor.

14. A method of constructing a cylindrical rotor core for a rotary electric machine, the method comprising:
   forming a cylindrical rotor core, including winding an elongated strip of grain-oriented electrical steel (GOES) having a linear grain orientation into one or more circular turns, each of the turns having a circular or arcuate grain orientation along a respective plane of the one or more circular turns and then joining the circular turns together to form the cylindrical rotor core;
   constructing a rotor of the rotary electric machine using the cylindrical rotor core;

eccentrically positioning the rotor radially within a stator of the rotary electric machine, such that the rotor has two degrees of freedom of motion, including rotating motion about a rotary axis of the rotor and orbiting motion about a center axis of the stator; and connecting the rotor to a rotor constraint mechanism to thereby constrain motion of the rotor and thereby enable the rotor to generate and transmit output torque to a load in at least one of the two degrees of freedom of motion.

15. The method of claim 14, wherein winding the elongated strip of GOES into one or more circular turns includes spirally-winding the elongated strip to form a helical coil having a plurality of circular turns, and then joining the plurality of circular turns together to form the cylindrical rotor core.

16. The method of claim 14, the method further comprising:

connecting a plurality of radially-projecting rotor teeth having a linear grain orientation to the cylindrical rotor core such that the linear grain orientation is radial with respect to the rotary axis of the cylindrical rotor core.

17. The method of claim 14, further comprising:

winding another elongated strip of GOES having the linear grain orientation into one or more additional circular turns each having a circular or arcuate grain orientation along a respective plane of the one or more additional circular turns;

joining the circular turns together to form a cylindrical stator core; and constructing the stator of the rotary electric machine using the cylindrical stator core.

\* \* \* \* \*